US006787066B2

(12) United States Patent
McLoughlin et al.

(10) Patent No.: US 6,787,066 B2
(45) Date of Patent: Sep. 7, 2004

(54) STABILIZATION SYSTEM FOR IMPROVING THE MELT VISCOSITY OF POLYPROPYLENE DURING FIBER PROCESSING

(75) Inventors: Kimberly Miller McLoughlin, Gibsonia, PA (US); Edwin B. Townsend, Pittsburgh, PA (US); Victor M. DiNardo, Monroeville, PA (US)

(73) Assignee: Sunoco Inc (R&M), Philadelphia, PA (US)

( * ) Notice: Subject to any disclaimer, the term of this patent is extended or adjusted under 35 U.S.C. 154(b) by 0 days.

(21) Appl. No.: 09/991,801

(22) Filed: Nov. 16, 2001

(65) Prior Publication Data

US 2003/0102462 A1 Jun. 5, 2003

(51) Int. Cl.[7] .......................... C09K 15/04; C09K 15/32
(52) U.S. Cl. ................... 252/399; 252/400.2; 524/147; 524/151; 524/153; 524/284
(58) Field of Search ............................. 252/399, 400.2; 524/147, 151, 153, 284

(56) References Cited

U.S. PATENT DOCUMENTS

| | | | | |
|---|---|---|---|---|
| 3,115,463 A | * | 12/1963 | Orloff | 252/400.24 |
| 3,556,999 A | * | 1/1971 | Messina | 252/400.2 |
| 4,652,385 A | * | 3/1987 | Cohen | 508/422 |
| 5,324,798 A | * | 6/1994 | Sanders et al. | 524/570 |
| 5,844,027 A | | 12/1998 | Burdick et al. | |
| 6,225,387 B1 | | 5/2001 | Hallenbeck et al. | |
| 6,270,892 B1 | | 8/2001 | Park et al. | |
| 6,348,514 B1 | * | 2/2002 | Calabrese et al. | 521/113 |

FOREIGN PATENT DOCUMENTS

| | | |
|---|---|---|
| EP | 0 391 438 A2 | 10/1990 |
| EP | 0 411 628 A | 2/1991 |
| EP | 0 629 720 A | 12/1994 |
| EP | 0 675 215 A | 10/1995 |
| FR | 1 145 214 A | 2/1973 |

OTHER PUBLICATIONS

"Practical Applications for Low Color "Phenol Free" Stabilization Systems" R.E. King III, Ciba Special Chemicals, Tarrytown, NY 10591, Sep. 17–19, 2000, No. XP009004744, pp. 1–19.

* cited by examiner

Primary Examiner—Cephia D. Toomer
(74) Attorney, Agent, or Firm—Robert A. Koons, Jr.; Matthew P. McWilliams; Buchanan Ingersoll PC

(57) ABSTRACT

The present invention is a stabilizing system for improving the melt viscosity of polyolefin resin during fiber processing. The addition of a liquid phosphite melt processing stabilizer to polypropylene homopolymer powder improves processing stability during spinning. The present invention covers spraying the liquid phosphite onto the powder along with octadecyl 3,5-di-tert-butyl-4-hydroxyhydrocinnamate which is applied via mineral oil solution in a steamer.

17 Claims, 6 Drawing Sheets

STABILIZATION SYSTEM FOR IMPROVING THE MELT VISCOSITY OF POLYPROPYLENE DURING FIBER PROCESSING

TECHNICAL FIELD

This invention relates to a stabilization system for improving the melt viscosity of polypropylene ("PP") resin during fiber processing. Specifically, this invention relates to the use of liquid phosphite during fiber processing to provide more uniform control of degradation.

BACKGROUND OF THE INVENTION

In conventional fiber production processes, polypropylene (PP) fibers are produced by first feeding PP powder or pellets to an extruder which melts the resin and blends it with pigments and other additives. The molten resin is forced through a many-holed die ("spinneret") as continuous strands are air-quenched and then drawn to the final fiber diameter either by mechanical draw or by forced air. The fiber production process induces significant degradation of the PP resin. The extrusion is typically conducted at high temperature to minimize die pressure and maximize throughput rate. The thermal degradation is exacerbated by the shear of mixing and more so by the high shear associated with forcing molten resin through the small orifices of the spinneret. Additional degradation takes place as the resin is quenched from high temperature in an air current.

A key to successful fiber production is maintaining a consistent melt viscosity upstream of the spinneret throughout the production campaign. Variations in melt viscosity may cause process upsets ranging from spinneret over-pressuring to filament breaks. These upsets represent lost production time and often unacceptable cost for the fiber producer. Variations in melt viscosity can also lead to the use of excessive stabilizer concentrations, which result in high costs and poor fiber quality.

Conventional PP resin fiber production methods control melt viscosity upstream of the spinneret by dry-blending granular or powder melt processing stabilizers with PP resin powder prior to extrusion. It is known to dry-blend PP powder with tris(2,4-di-tert-butylphenyl)phosphite. Tris(2,4-di-tert-butylphenyl)phosphite is a processing stabilizer commercially available from Ciba Specialty Chemicals under the tradename Irgafos 168. The extrusion is relied upon to provide thorough mixing of the stabilizers and PP resin before significant degradation can take place. However, the extrusion portion of a conventional fiber process may not provide adequate mixing to ensure uniform distribution of stabilizers throughout the polymer. In addition, due to the high extrusion temperatures used for fiber production, significant polymer degradation can occur before the stabilization additives are well mixed with the PP resin. The resulting non-uniform stabilization and non-uniform degradation may lead to poor melt viscosity control of the PP resin during fiber processing. Therefore, there exists a need for a PP resin system that degrades to a consistent beam melt flow during the extrusion process.

The present invention provides for a stabilization system to improve the melt viscosity control of PP resin during fiber processing. The system consists of a phenolic anti-oxidant and a liquid phosphite dissolved or dispersed in mineral oil or another liquid carrier and applied to PP powder prior to extrusion and/or fiber processing. The present stabilization system is designed to improve the consistency of resin melt viscosity during fiber processing by providing more uniform control of degradation than conventional additives.

SUMMARY OF THE INVENTION

The present invention involves a stabilization system for improving the melt viscosity of polypropylene during fiber processing consisting essentially of a phenolic anti-oxidant, a liquid phosphite and a liquid carrier.

Additionally, the present invention involves stabilizer mixture suitable for improving the melt viscosity of polypropylene which mixture consists essentially of approximately 50–100 ppm of a phenolic anti-oxidant, approximately 150–500 ppm of a liquid phosphite and a liquid carrier.

The present invention involves a stabilization system suitable for improving the melt visocisity of polypropylene homopolymer consisting essentially of 50–100 ppm of octadecyl 3,5-di-tert-butyl-4-hydroxyhydrocinnamate phosphite, 150–500 ppm of trisnonylphenol phosphite and mineral oil.

The present invention provides the advantages improving the melt viscosity of polypropylene resin during fiber processing. Those, and other advantages and benefits will become apparent from the Detailed Description of the Invention.

BRIEF DESCRIPTION OF THE DRAWINGS

For the present invention to be easily understood and readily practiced, the present invention will now be described, for purposes of illustration and not limitation, wherein.

DETAILED DESCRIPTION OF THE INVENTION

Figure 1:
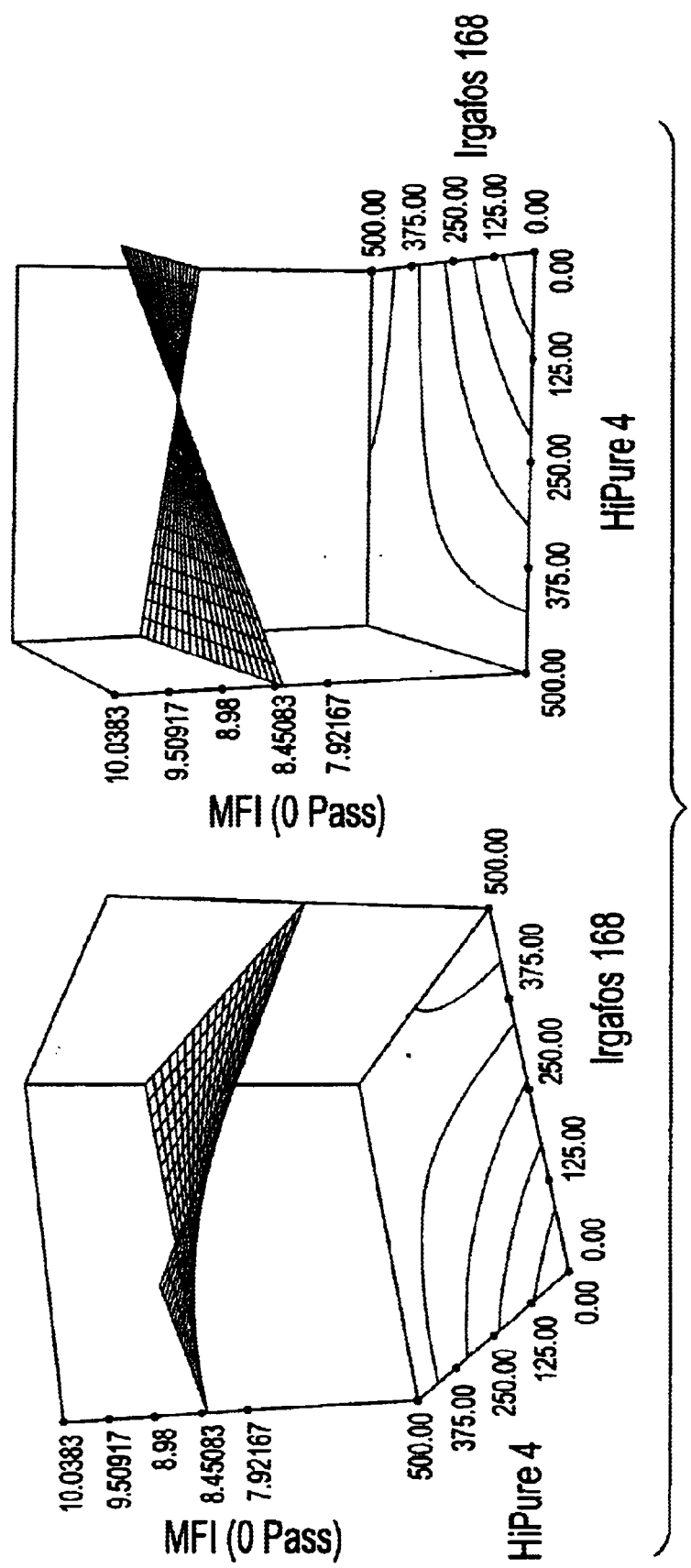
FIG. 1 shows a plot of MFI versus tris(2,4-di-tert-butylphenyl)phosphite and trisnonylphenol phosphite levels following the zero pass of a multipass extrusion experiment.

The present invention stabilization system consists of a phenolic anti-oxidant and a liquid phosphite dissolved or dispersed in mineral oil or another liquid carrier and applied to PP powder prior to extrusion and/or fiber processing. The liquid phosphite, chemical name trisnonylphenol phosphite, is a clear liquid. The chemical structure of trisnonylphenol phosphite is shown below. Trisnonylphenol phosphite is commercially available from Dover Chemicals under the tradename Doverphos HiPure 4.

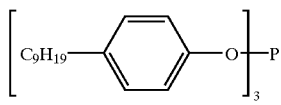

Trisnonylphenol phosphite

CAS Number: 26523-78-4
Appearance: Clear Liquid
Molecular Weight: 688 g/mol
% Phosphorus: 4.3
Density, lb./gal: 8.2
Viscosity, cps@25° C.: 7,800

The following describes experiments conducted and evaluations made of the present liquid phosphite stabilization system. Mineral oil solubility tests, multi-pass extrusion studies, and fiber spinning experiments were conducted.

Experimental

Mineral Oil Solubility Test

Trisnonylphenol phosphite and mineral oil were heated in separate graduated cylinders in an oil bath at 106.7° C. for 11.5 hours. They were then combined and monitored over time for phase separation and/or color change.

There were no observable changes in color or phase morphology upon mixing the liquid trisnonylphenol phosphite and mineral oil. This apparent solubility implies that trisnonylphenol phosphite could be mixed with mineral oil and applied directly to powders during plant production. This application method is expected to provide improved mixing of phosphite with polypropylene homopolymer.

Multi-pass Extrusion Tests

Powders were dry blended with various levels of the liquid additive or dry additive and then run under standard multi-pass conditions. The conditions are shown below in Table I. For each sample (at each quench rate) fiber MFI and tenacity were measured. In addition, maximum spin speed on the Hills line was measured at a quench air setting of 600 using the processing conditions reported in Table I.

TABLE I

Fiber Processing Conditions

| Extruder | 290 C. |
|---|---|
| Die | 302 hole, round |
| take-up Godet speed | 1050 mpm |
| Denier | 2.8 target |
| Quench Temp | 60 F. |
| Throughput | 0.39 ghm |
| Quench Air Speeds | 0, 200, 400, 600, 800 |

The results of the multi-pass extrusion tests are shown in Table II.

TABLE II

Multipass Extrusion Results

Melt Flows measured at 232° C.

| | Pass 0 | Pass 1 | Pass 3 |
|---|---|---|---|
| polypropylene homopolymer powder | 10.0 | 19.8 | 63.7 |
| polypropylene homopolymer + 500 ppm trisnonylphenol phosphite | 8.6 | 15.9 | 48.5 (foamed) |

TABLE II-continued

Multipass Extrusion Results

Melt Flows measured at 232° C.

| | Pass 0 | Pass 1 | Pass 3 |
|---|---|---|---|
| polypropylene homopolymer + 500 ppm tris(2,4-di-tert-butylphenyl)phosphite | 7.8 | 16.7 | 54.1 |

As usual, the zero pass was run on the 1.5" Wayne extruder and the subsequent passes were run on the 1.0" extruder. It may be noted that on the $3^{rd}$ pass, the sample containing trisnonylphenol phosphite foamed. The polymer MFI was obtained by taking the foamed pellets and drying them before MFI evaluation.

As previously mentioned, initial multipass extrusion results are given in Table II. These results indicate that addition of 500 ppm trisnonylphenol phosphite helps to control the MFI. In fact, the addition of 500 ppm trisnonylphenol phosphite was shown to control the MFI as well as known tris(2,4-di-tert-butylphenyl)phosphite.

Because the final melt flow index of the product polypropylene at customer sites is oftentimes approximately 15 MFI, the Table II results were promising. These results show that trisnonylphenol phosphite provides a lower MFI than the zero pass. Therefore, additional designed experiments were performed to map out the experimental space using trisnonylphenol phosphite and tris(2,4-di-tert-butylphenyl) phosphite in the ranges of 0–500 ppm. These results are detailed in Table III.

TABLE III

DOE results for the tris(2,4-di-tert-butylphenyl)phosphite and trisnonylphenol phosphite study

| Factor A: tris(2,4-di-tert-butylphenyl) phosphite | Factor B: trisnonylphenol phosphite | Response MFI (0 Pass) | Response MFI (1 Pass) |
|---|---|---|---|
| 250.00 | 250.00 | 8.6 | 15.7 |
| 0.00 | 500.00 | 8.6 | 15.9 |
| 0.00 | 0.00 | 10.2 | 23.2 |
| 500.00 | 0.00 | 7.8 | 16.7 |
| 0.00 | 250.00 | 8.9 | 18.3 |
| 250.00 | 0.00 | 9.1 | 19.1 |
| 500.00 | 500.00 | 8.5 | 12.9 |
| 500.00 | 250.00 | 8.5 | 15.2 |
| 250.00 | 500.00 | 8.5 | 14.1 |
| 250.00 | 250.00 | 8.6 | 15.1 |

The results from the zero pass are shown graphically in FIG. 1, which shows MFI as a function of trisnonylphenol phosphite and tris(2,4-di-tert-butylphenyl)phosphite levels. It is known to typically add as much as 500 ppm of tris(2,4-di-tert-butylphenyl)phosphite to polypropylene homopolymer (PPHP) as it is being extruded. However, it is possible to vary the amount of tris(2,4-di-tert-butylphenyl) phosphite added. From the plot shown in FIG. 1, it is shown that MFI variations may still occur. In the area where trisnonylphenol phosphite level is zero ppm, the slope of the line (or plot) is very steep. However, the data indicates that if approximately 150 ppm of trisnonylphenol phosphite were added, the slope of the line would flatten out dramatically. Thus, variation in MFI should be less with the addition of trisnonylphenol phosphite.

FIG. 1, details a plot of MFI versus tris(2,4-di-tert-butylphenyl)phosphite and trisnonylphenol phosphite levels following the zero pass of a multipass extrusion experiment. Note that FIG. 1 shows two plots which are the same plots, only rotated differently to better show the points made in the text.

Figure 2:
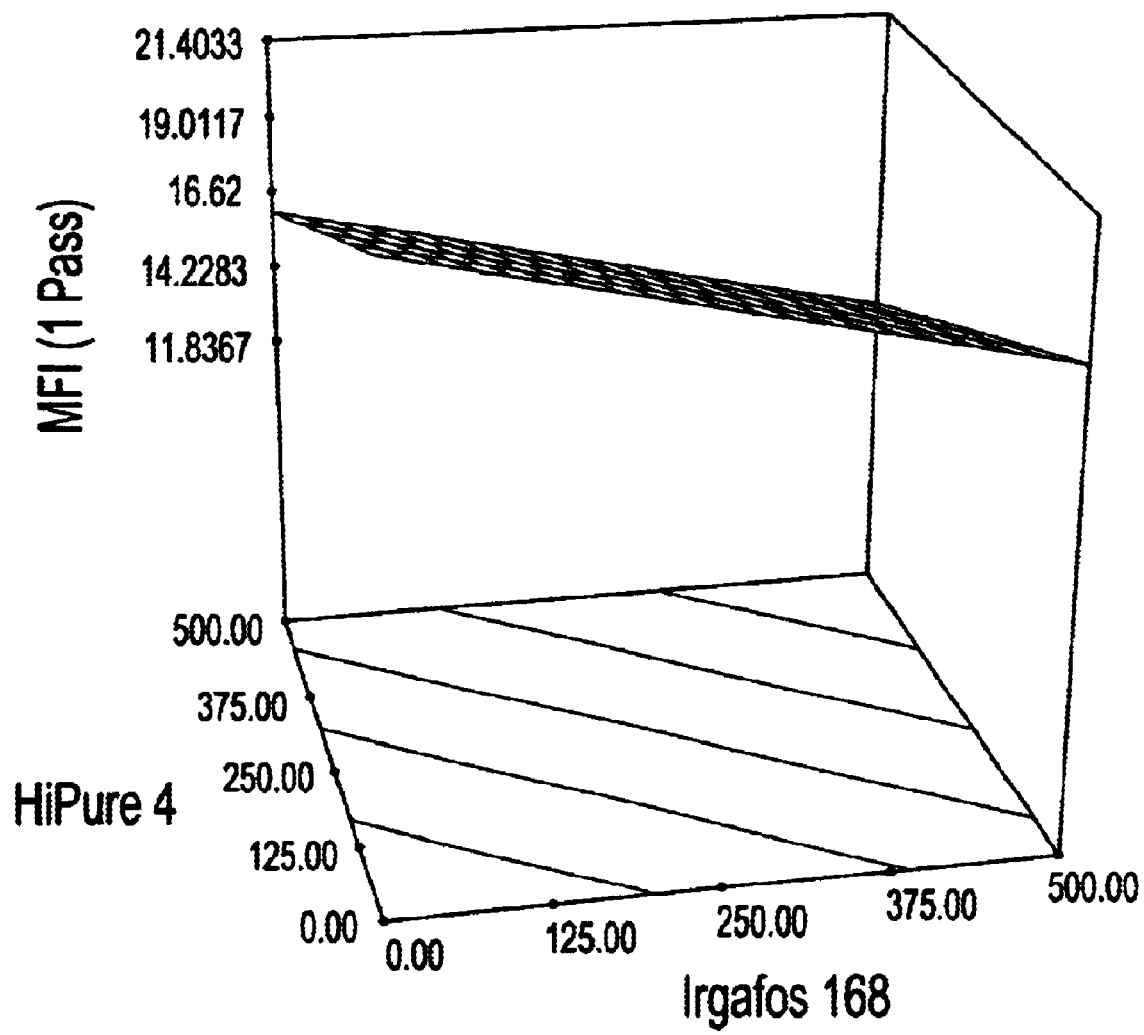
FIG. 2 shows a plot of MFI versus tris(2,4-di-tert-butylphenyl)phosphite and trisnonylphenol phosphite levels following the $1^{st}$ pass of a multipass extrusion experiment.

FIG. 2, shows the results from the $1^{st}$ pass of the multipass extrusion experiment. Recall that the $1^{st}$ pass MFI is representative of a typical beam MFI at a customer site. Note that the slope of these plot is less than that discussed before. Thus, the data in this figure suggests that the addition of any amount (small or large) of trisnonylphenol phosphite should minimize MFI variability in the beam.

Based on these encouraging results, fiber spinning experiments were conducted.

Fiber Spinning Experiments

Polypropylene homopolymer powder (Run 22) was dry-blended with additives prior to spinning on the Hills pilot CF line. Fibers were produced on the Hills line at five different quench settings over the full air volume flow rate range achievable on that line. Processing conditions are detailed in Table I.

Fiber Spinning Results: Initial Fiber MFI and Tenacity Study

An initial spinning study was conducted to assess the effect of adding a small concentration of trisnonylphenol phosphite to a typical fiber spinning stabilization package. The formulation consisted of 75 ppm octadecyl 3,5-di-tert-butyl-4-hydroxyhydrocinnamate sprayed onto the powder during plant production and an additional 500 ppm tris(2,4-di-tert-butylphenyl)phosphite, which was dry-blended with the powder prior to spinning. Octadecyl 3,5-di-tert-butyl-4-hydroxyhydrocinnamate is commercially available from Ciba Specialty Chemicals under the tradename Irganox 1076. Three distinct materials were evaluated: (1) the powder as supplied (75 ppm octadecyl 3,5-di-tert-butyl-4-hydroxyhydrocinnamate and no tris(2,4-di-tert-butylphenyl)phosphite); (2) the powder as supplied and dry-blended with 500 ppm tris(2,4-di-tert-butylphenyl)phosphite; (3) powder as supplied and dry-blended with 500 ppm tris(2,4-di-tert-butylphenyl)phosphite and 100 ppm trisnonylphenol phosphite.

Figure 3:
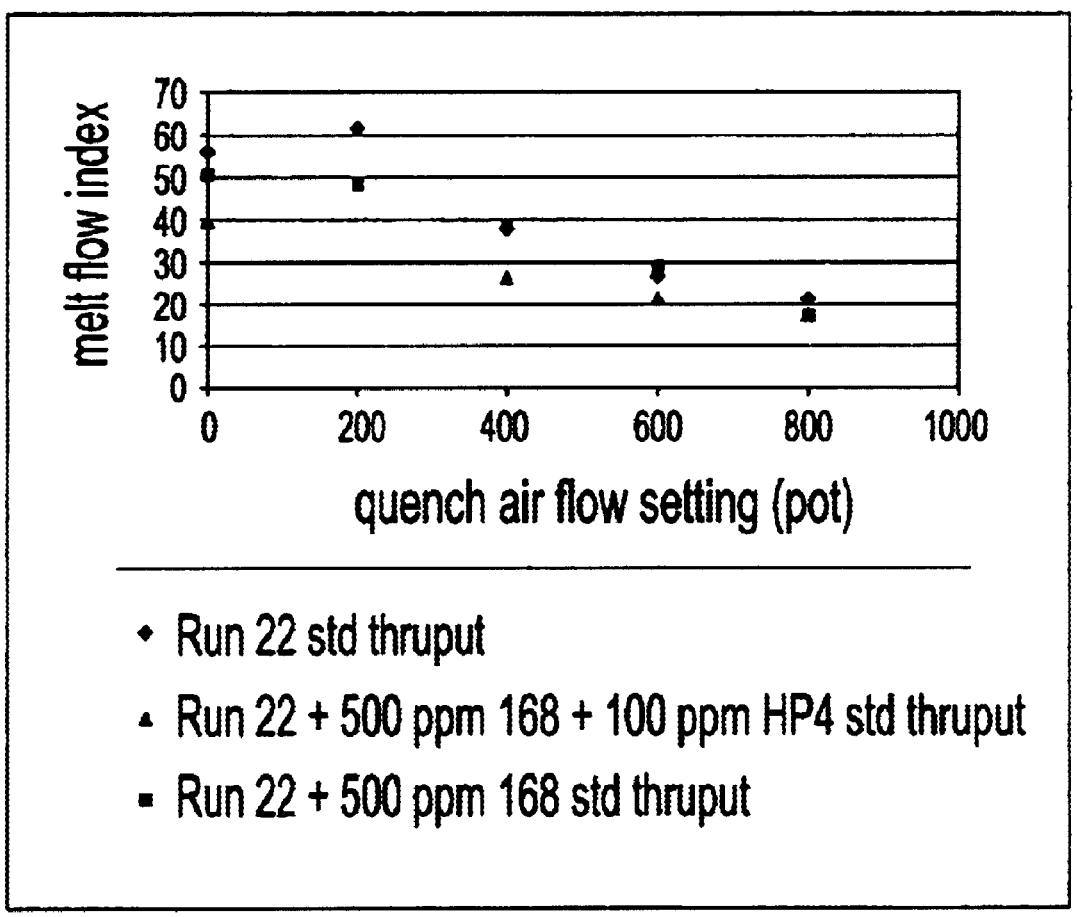
FIG. 3 shows the melt flow measured for fibers produced at various quench air speeds (reported as potentiometer settings).
Figure 4:
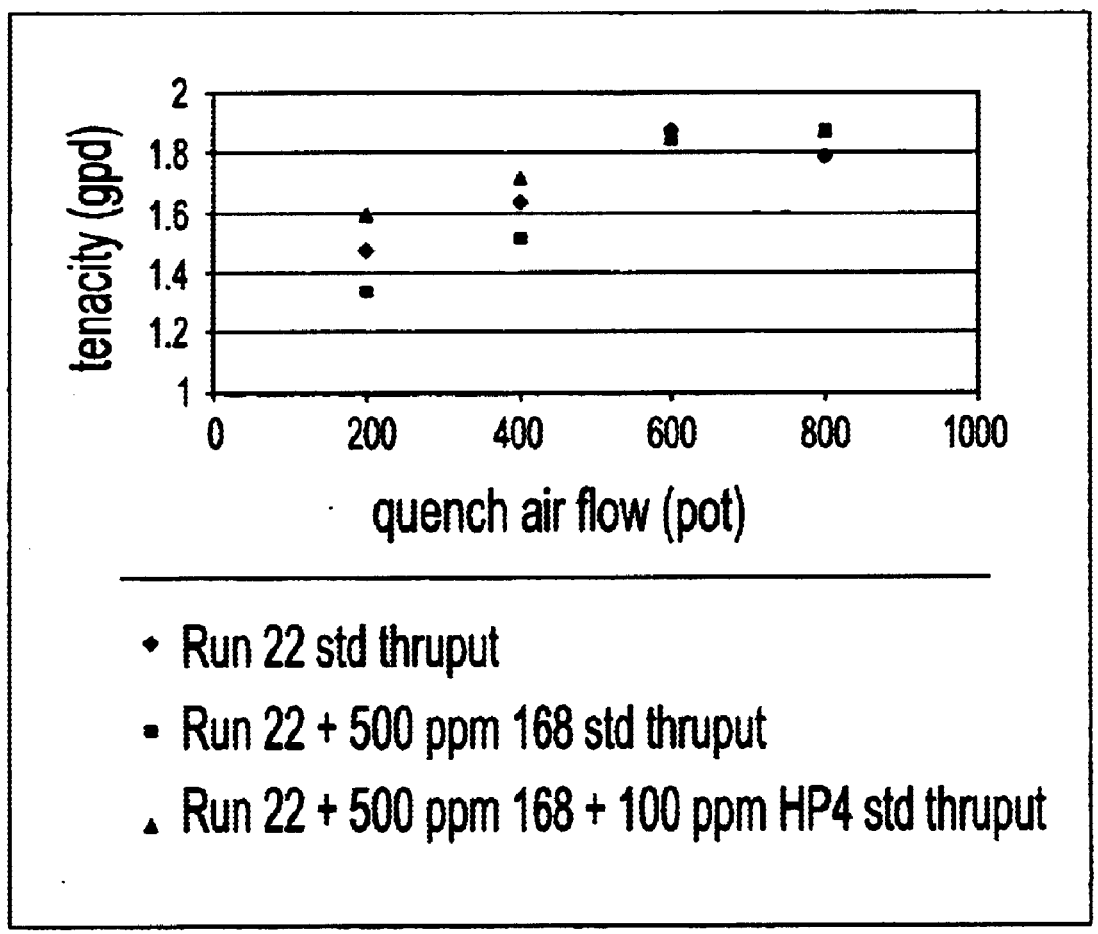
FIG. 4 shows the tenacity measured for fibers produced at the various quench air speeds.

FIG. 3, shows the melt flow measured for fibers produced at various quench air speeds (reported as potentiometer settings.) FIG. 4 shows the tenacity measured for fibers produced at the various quench air speeds. For each of the formulations, fiber melt flow decreases and tenacity increases as quench air flow rate increases. This result is expected because the faster the air flow, the more rapid the quench from molten to solid plastic. The solid plastic is less susceptible than to oxidative degradation because oxygen diffusion is slower in a solid than in a molten material.

For the formulation containing no tris(2,4-di-tert-butylphenyl)phosphite melt processing stabilizer, fiber melt flow values are much higher (and fiber tenacity lower) at low quench air flow rates than those of materials containing tris(2,4-di-tert-butylphenyl)phosphite. Of the two formulations containing tris(2,4-di-tert-butylphenyl)phosphite, the formulation that also contains trisnonylphenol phosphite has significantly lower MFI's and higher fiber tenacities at the 400 and 600 pot settings compared to the formulation containing no trisnonylphenol phosphite. To assess whether the difference is due to the presence of trisnonylphenol phosphite or is simply attributable to the additional phosphite, follow-up spinning experiments have been conducted as described below.

Fiber Spinning Results: Follow-up Fiber MFI and Tenacity Study

To test whether trisnonylphenol phosphite leads to a reduction in fiber MFI (and corresponding increase in fiber tenacity) compared to an equivalent amount of tris(2,4-di-tert-butylphenyl)phosphite, the following study was conducted. Three materials were evaluated. Each contained 75 ppm octadecyl 3,5-di-tert-butyl-4-hydroxyhydrocinnamate that was applied during plant production. To the first, 500 ppm tris(2,4-di-tert-butylphenyl)phosphite and 100 ppm trisnonylphenol phosphite was added. To the second, 100 ppm trisnonylphenol phosphite was added. To the third, 600 ppm tris(2,4-di-tert-butylphenyl)phosphite was added.

For the processing conditions used herein, fiber spinning was extremely difficult for all of the samples. Die drool and blowouts caused numerous breaks. As a result, the fiber samples that were obtained and tested for MFI and tenacity were small. In the case of the material containing 600 ppm tris(2,4-di-tert-butylphenyl)phosphite, the sample could not be taken into the aspirator gun without breaks at the die face, so no fibers could be obtained for tenacity measurements.

Figure 5:
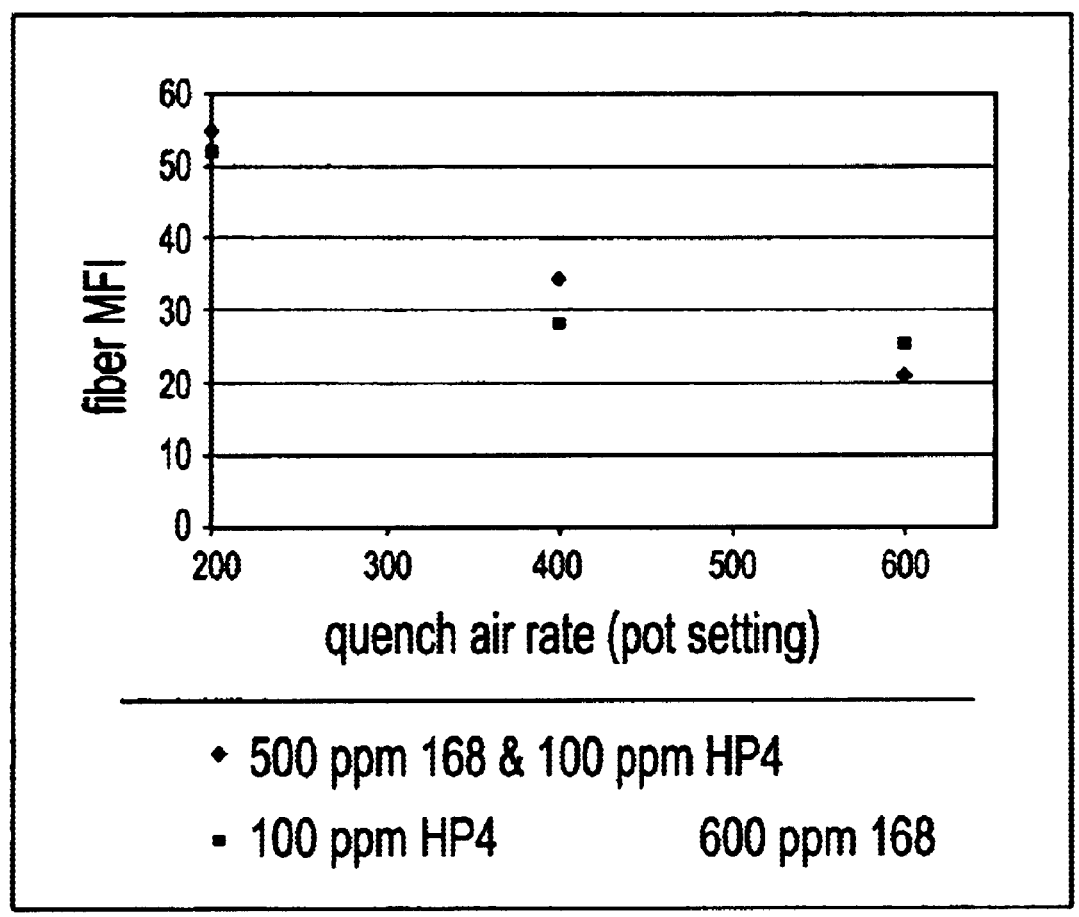
FIG. 5 shows the melt flow measured for fibers produced at various quench air speeds (reported as potentiometer settings.)
Figure 6:
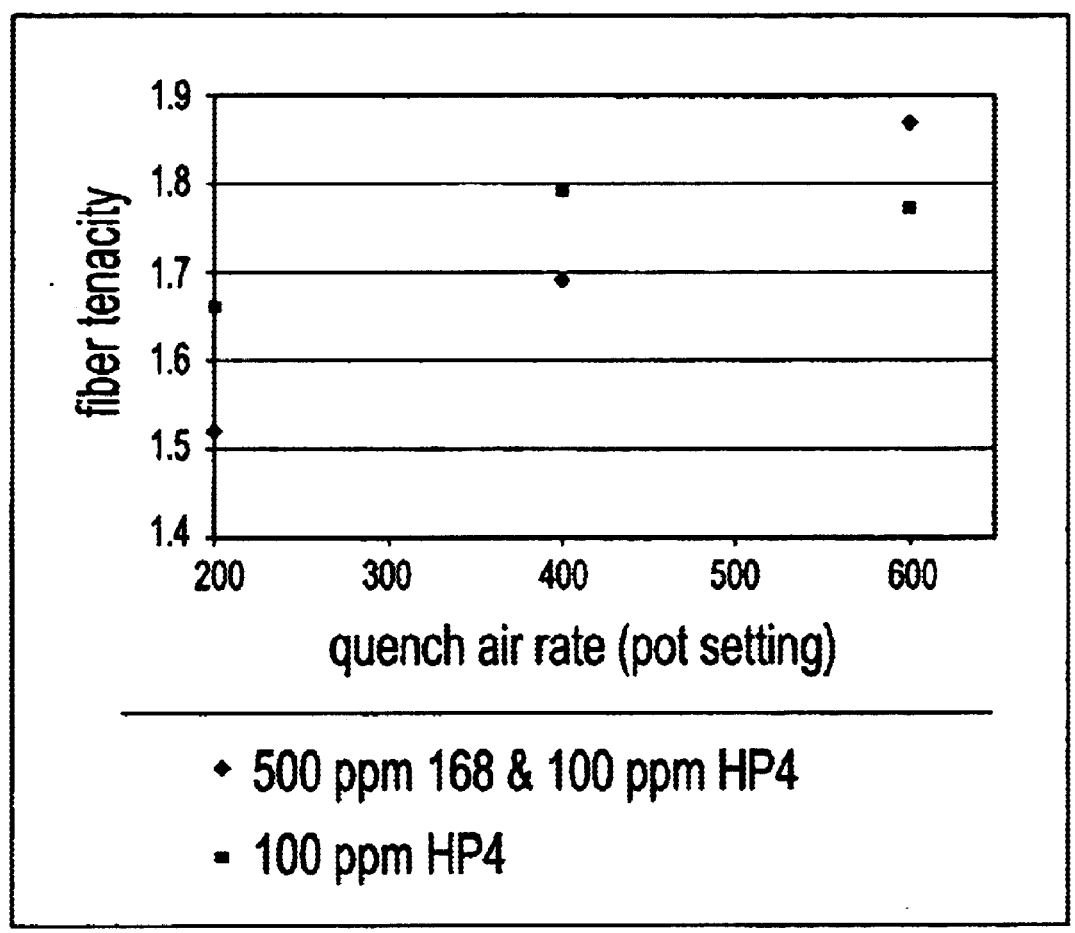
FIG. 6 shows the tenacity measured for fibers produced at the various quench air speeds.

The results measured for the samples obtained are shown in FIGS. 5 and 6. FIG. 5 shows the melt flow measured for fibers produced at various quench air speeds (reported as potentiometer settings.) FIG. 6 shows the tenacity measured for fibers produced at the various quench air speeds. At each quench speed tested, the material containing 100 ppm trisnonylphenol phosphite and 500 ppm tris(2,4-di-tert-butylphenyl)phosphite had a lower fiber MFI than the material containing 600 ppm tris(2,4-di-tert-butylphenyl)phosphite. This suggests that the trisnonylphenol phosphite provides improved stabilization compared to an equivalent amount of tris(2,4-di-tert-butylphenyl)phosphite. This difference may be due to chemical differences in the two phosphites, or it may be attributable to the fact that trisnonylphenol phosphite is a liquid and provides more intimate mixing with the PP powder than the tris(2,4-di-tert-butylphenyl)phosphite powder.

Interestingly, the materials containing only 100 ppm trisnonylphenol phosphite and no tris(2,4-di-tert-butylphenyl)phosphite exhibited lower fiber MFI's at the low quench air rates than either the material containing 600 ppm tris(2,4-di-tert-butylphenyl)phosphite or the material containing a mixture of 500 ppm tris(2,4-di-tert-butylphenyl)phosphite and 100 ppm trisnonylphenol phosphite. This result suggest that a stabilization system that uses trisnonylphenol phosphite as a stand alone melt processing stabilizer may be more efficient than a combination of trisnonylphenol phosphite and tris(2,4-di-tert-butylphenyl)phosphite.

As shown in FIG. 6, fiber tenacity increases as fiber MFI decreases. Thus, at a given set of fiber processing conditions, materials processed with a stabilization system that leads to lower fiber MFI also exhibit higher tenacities.

Maximum Spinning Speed Results

The results of the maximum spinning speed tests for both spin trials are reported in Table IV. The materials containing no trisnonylphenol phosphite did not break at spinning speeds up to 2625 mpm, the maximum capability of the machine. All of the materials that contained trisnonylphenol phosphite broke at spinning speeds less than 2625 mpm. The material that contained 600 parts trisnonylphenol phosphite could not be loaded onto a Godet roll for testing due to excessive breaks at the die. As discussed above, fiber spinning was extremely difficult for all of the samples for the processing conditions used herein.

TABLE IV

Maximum Spinning Speed Results

| Trial date | ppm tris(2,4-di-tert-butylphenyl) phosphite | ppm trisnonylphenol phosphite | Max Spin Speed (mpm) | St Dev (mpm) |
|---|---|---|---|---|
| May 8, 2000 | 0 | 0 | >2525 | |
| May 8, 2000 | 500 | 0 | >2625 | |
| May 8, 2000 | 500 | 100 | 2124 | 257 |
| Aug. 30, 2000 | 500 | 100 | 1931 | 542 |
| Aug. 30, 2000 | 0 | 100 | 1471 | 80 |
| Aug. 30, 2000 | 0 | 600 | N/A | |

The solubility study demonstrates that trisnonylphenol phosphite is soluble in mineral oil at the temperature of the solution that is currently used for plant application of octadecyl 3,5-di-tert-butyl-4-hydroxyhydrocinnamate to powder. This study shows the feasibility of adding trisnonylphenol phosphite to the powder in the steamer.

The multi-pass extrusion study demonstrates that trisnonylphenol phosphite behaves very much like tris(2,4-di-tert-butylphenyl)phosphite as a melt processing stabilizer. A designed experiment and statistical analysis show that equal amounts of tris(2,4-di-tert-butylphenyl)phosphite and trisnonylphenol phosphite provide roughly equivalent MFI stability.

Finally, Hills lines CF experiments demonstrate that adding trisnonylphenol phosphite to polypropylene homopolymer powder prior to fiber spinning generally leads to lower fiber MFI's (at identical quench air rates) than those observed for materials containing only tris(2,4-di-tert-butylphenyl)phosphite or no melt processing stabilizer. Materials containing trisnonylphenol phosphite exhibited lower maximum spinning speeds than materials containing no trisnonylphenol phosphite under the spinning conditions used here.

Although the present invention has been described in conjunction with preferred embodiments thereof, those of ordinary skill in the art will recognize that many modifications and variations may be made. The following claims are intended to cover all such modifications and variations.

What is claimed is:

1. A stabilized polypropylene for use in fiber processing comprising:
    a polypropylene, said polypropylene being coated with a stabilizer system consisting essentially of:
        50 to 100 ppm of a phenolic anti-oxidant and 150–500 ppm of a liquid phosphite; said anti-oxidant and said phosphite being dispersed or dissolved in a liquid carrier.

2. The stabilized polypropylene as claimed in claim 1 wherein the phenolic anti-oxidant is a cinnamate derivative.

3. The stabilized polypropylene as claimed in claim 2 wherein the liquid phosphite is trisnonylphenol phosphite.

4. The stabilized polypropylene as claimed in claim 3 wherein the liquid carrier is mineral oil.

5. The stabilized polypropylene as claimed in claim 4 wherein the phenolic anti-oxidant is octadecyl 3,5-di-tert-butyl-4-hydroxyhydrocinnamate.

6. The stabilized polypropylene as claimed in claim 1 additionally comprising approximately 150–500 ppm of tris(2,4-di-tert-butylphenyl)phosphite.

7. The stabilized polypropylene as claimed in claim 1 wherein the phenolic anti-oxidant and the liquid phosphite are in a concentration ratio of about 1:2.0 to about 1:6.7.

8. The stabilized polypropylene as claimed in claim 7 wherein the liquid phosphite is trisnonylphenol phosphite.

9. The stabilized polypropylene as claimed in claim 8 wherein the phenolic anti-oxidant is octadecyl 3,5-di-tert-butyl-4-hydroxyhydrocinnamate.

10. The stabilized polypropylene as claimed in claim 9 wherein the liquid carrier is mineral oil.

11. The stabilized polypropylene as claimed in claim 10 additionally comprising approximately 150–500 ppm of tris(2,4-di-tert-butylphenyl)phosphite.

12. A method for improving the melt viscosity control of polypropylene in fiber processing, the method comprising:
    spraying a stabilizer composition onto a polypropylene, said polypropylene being in powder form, wherein said stabilizer composition consists essentially of:
        approximately 50–100 ppm of a phenolic anti-oxidant, and approximately 150–500 ppm of a liquid phosphite, said anti-oxidant and said phosphite being dispersed or dissolved in a liquid carrier.

13. The method as claimed in claim 12 wherein the liquid phosphite is trisnonylphenol phosphite.

14. The method as claimed in claim 13 wherein the phenolic anti-oxidant is a cinnamate derivative.

15. The method as claimed in claim 14 wherein the phenolic anti-oxidant is octadecyl 3,5-di-tert-butyl-4-hydroxyhydrocinnamate.

16. The method as claimed in claim 15 wherein the liquid carrier is mineral oil.

17. The method as claimed in claim 16 additionally comprising
    applying approximately 150–500 ppm of tris(2,4-di-tert-butylphenyl)phosphite to said polypropylene.

* * * * *